United States Patent [19]
> Johnson

[11] Patent Number: 4,811,206

[45] Date of Patent: Mar. 7, 1989

[54] DATA PROCESSING SYSTEM WITH OVERLAPPED ADDRESS TRANSLATION AND ADDRESS COMPUTATION

[75] Inventor: William M. Johnson, San Jose, Calif.

[73] Assignee: IBM Corporation, Armonk, N.Y.

[21] Appl. No.: 819,772

[22] Filed: Jan. 16, 1986

[51] Int. Cl.⁴ .............................................. G06F 12/10
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,949,378 | 4/1976 | Crabb et al. | 364/200 |
| 4,128,875 | 12/1978 | Thurber et al. | 364/200 |
| 4,466,056 | 8/1984 | Tanahashi | 364/200 |
| 4,695,950 | 9/1987 | Brandt et al. | 364/200 |

*Primary Examiner*—Gareth D. Shaw
*Assistant Examiner*—Debra A. Chun
*Attorney, Agent, or Firm*—Walter J. Madden, Jr.; Alan H. MacPherson; John L. Jackson

[57] ABSTRACT

A method of operating a data processing system using virtual memory in which virtual memory addresses are formed by a base register value and a displacement value and are mapped to real memory addresses includes the steps of adding the base register value content and the displacement value, and simultaneously with the adding operation, performing a translation of the base register value to produce a virtual address corresponding to the base register value.

8 Claims, 1 Drawing Sheet ced therewith. Each page table pointed to by a virtual frame address contains the real locations of all of the pages in one of the frames. Therefore, if a particular frame is divided into, for example, 16 pages, there
DATA PROCESSING SYSTEM WITH OVERLAPPED ADDRESS TRANSLATION AND ADDRESS COMPUTATION

BACKGROUND OF THE INVENTION

1. Field of the Invention

This invention relates to a data processing system having virtual memory, and relates more particularly to such a system employing overlapped virtual address translation and address computation.

2. Prior Art

It is well known in data processing systems to use a hierarchical memory system which employs a high-access-speed, low-capacity memory as a main memory and a low-access-speed, high-capacity memory as a secondary store. The purpose of the main memory is to provide appropriate transfer rates to and from a processing module, with data and other information being transferred from the secondary store or memory to the main memory as required. A virtual memory system is created by providing a hierarchical memory system with the abililty to automatically transfer requested information from the secondary store to main memory when that information does not reside in main memory at the time of its request. In this manner, the user is not aware of any inherent limitations due to the size of the main memory.

The advantage of a virtual storage implementation is that not all of the stored information, either program or data, needed for the progress of the computation is required to be stored in main memory simultaneously, but that for large periods of time, parts of the stored information may reside in the secondary store. This advantage follows from the fact that main memory is generally more expensive on a per unit or per bit basis than the secondary store.

For virtual memory applications, the information is partitioned into a number of segments such that, during the progress of the computation, the information of a segment will either be totally present in, or totally absent from, the main or primary store. If all the segments have the same size. they are generally referred to as pages, in which case the primary store is then subdivided into so-called page frames which are units of the store able to contain exactly one page.

The random location of segments and pages in main storage necessitates the translation of virtual addresses to actual or real addresses using a set of address translation tables that are located in main storage and conventionally are referred to as page frame tables. In a large virtual system, a great many such address translation tables are employed and may be organized in a number of different ways. The essential feature of any such organization is that the particular virtual address must logically map to a memory location in the tables which will contain the real address for the virtual address.

Functionally, the operation of such address conversion tables is as follows: the high order bits of the particular virtual address are used to access a specific section of the translation tables which relate to a particular frame or segment, whereupon a search is performed on the lower bits to determine if a particular virtual address is contained therein and, if so, what real address is associated therewith. Each page table pointed to by a virtual frame address contains the real locations of all of the pages in one of the frames. Therefore, if a particular frame is divided into, for example, 16 pages, there would be 16 page tables for each frame, and a separate frame table which would have the entries pointing to a particular set of individual page table. It should be understood that the above description is generalized in nature and that there are many different ways of organizing the address conversion utilizing the page tables, as well as the means for addressing the same, starting with the CPU-produced virtual address.

When making the actual address translation, regardless of the details of the overall system organization and use of the page tables, the proper entry point into the page-frame tables is made and the page tables are accessed using the presented virtual address as the argument and, usually after a plurality of memory accesses, the desired entry in the page tables is found. The byte portion of the virtual address or "byte offset" is essentially a relative address and is the same in the virtual page as in the real page, whereby once the desired real page address portion of the virtual address has been translated, the byte offset portion is concatenated onto the real page address location to provide the real byte address in main storage.

As is well known in current virtual memory systems, in order to avoid having to translate a virtual address each time the memory is accessed, translations of recently used virtual addresses to real addresses are retained in a special set of rapidly accessible tables or high speed memories referred to as Directory Look-Aside Tables (DLAT) or Translation Look-Aside Buffers (TLBs). These tables or buffers are conventionally special high speed or rapidly accessible memories which may be accessed much more rapidly than the previously described page frame tables, whereby frequently used virtual addresses may be stored in this table and accessed very rapidly, with a resultant saving of a great deal of execution time within the computer. The efficiency of such TLB address translation systems is predicated upon the fact that, subsequent to the first access to a particular virtual page, there will be a great many accesses to the same page during a given program execution. As indicated above, even though subsequent accesses are to different lines and bytes within a page, the virtual-to-real page address translation is the same for that page regardless of which line or byte is being addressed.

In a microprocessor system which employs virtual addressing, the delay caused by the virtual address translation process limits the time available for load and store accesses to main storage. This impact may be reduced if the microprocessor includes a data cache, since the cache may be accessed in parallel with translation of the virtual address. However, a data cache of sufficient size generally cannot be economically placed on a Very Large Scale Integrated (VLSI) microprocessor. Since the storage access time for operands is a major performance parameter, it is very desirable to have some method of reducing or eliminating the address translation delay from the storage access path even if a data cache is not used.

SUMMARY OF THE INVENTION

The present invention involves the address translation of only the high order bits in the virtual address while the low order bits of the virtual address are passed directly to the address computation process. The address translation affects only the high order bits of the address presented to the translator.

The low-order bits form a displacement into both the virtual and real storage pages and are invariant in the translation process. Also, the large majority of displacements used in address generation affect only these low-order bits. Thus, it is possible to begin address translation so that it occurs in parallel with the address computation; this address translation is performed only on the high-order bits, which are not normally changed by the address computation. At the end of the address computation, the low-order addresses are available from the address computation, and the high-order addresses are available from the address translation. In the cases where the address computation does affect the high-order bits, the storage access can be held off for a cycle while the translation is done on the actual address. However, in the majority of cases, there is no effect of address translation on storage access time.

BRIEF DESCRIPTION OF THE DRAWING

The single FIGURE of the drawing is a block diagram of the data flow in a microprocessor system employing the present invention.

DESCRIPTION OF THE PREFERRED EMBODIMENT

Figure 1:
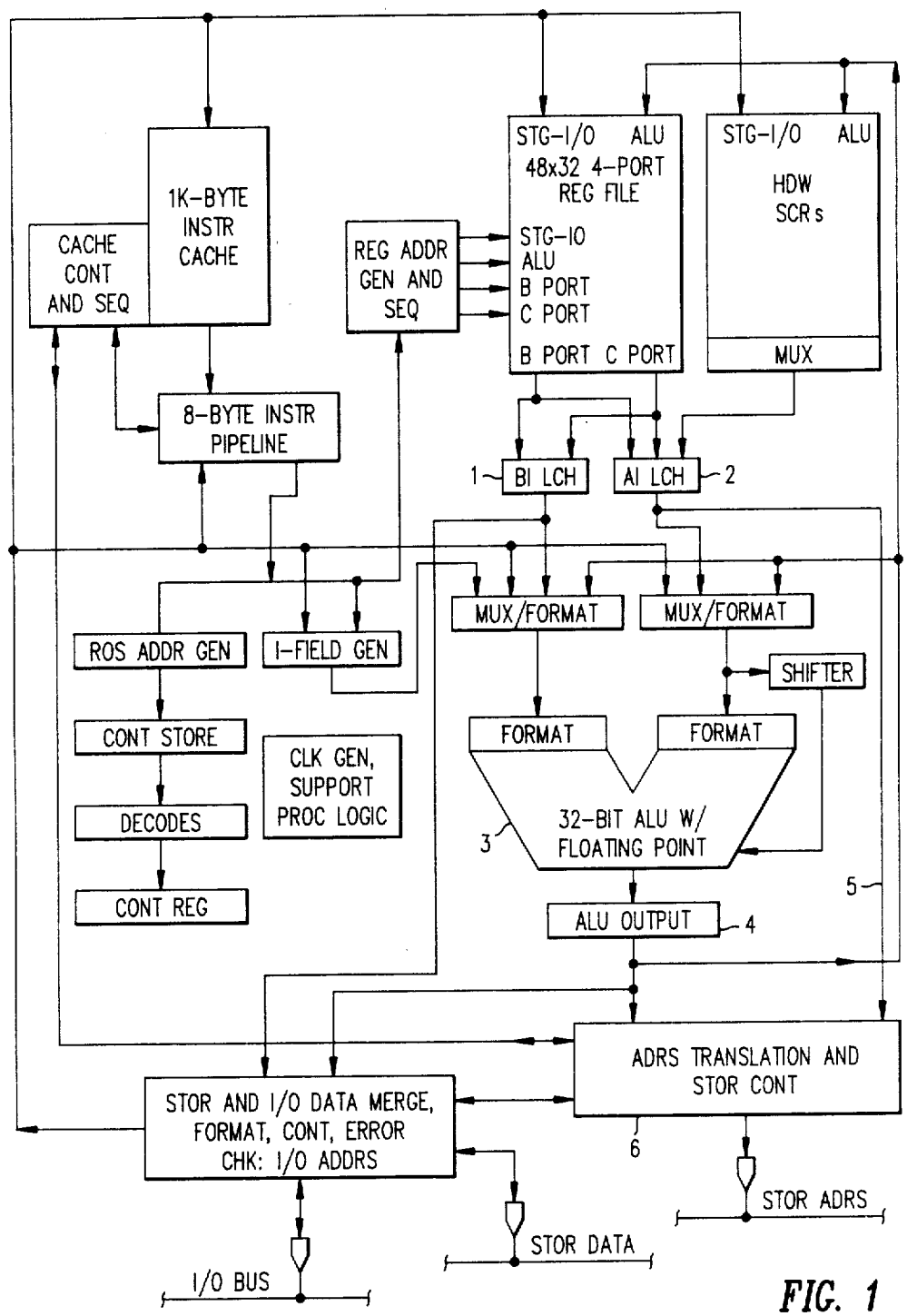

FIG. 1 shows a high-level data flow for a typical VLSI microprocessor. This microprocessor normally forms addresses by adding the content of a base register with a displacement contained in the storage access instruction. During execution, the base register content is contained in AI latch 2, and the displacement is contained in the BI latch 1. These quantities are supplied through multi-plexor/format elements 8, 9 and are added in arithmetic-logic unit (ALU) 3 to form the operand address which is placed in ALU output register 4. The output of this register feeds address translation and storage control logic 6. The output of address translation and storage control logic 6 represents the real memory page number and the page index and is supplied as the storage address on line 7. The addition requires one processor cycle to complete, and the address translation takes an additional cycle before the storage access can begin.

The base address, which may be assumed, for example, to contain 32 bits is combined by adding with the displacement value from the storage access instruction to form the virtual address. The virtual address would then comprise 21 high order bits representing the virtual page number (VPN) portion and 11 lower order bits representing the page index portion. The 21 bits of the VPN are sent to the address translation and storage control logic 6 of FIG. 1 where the VPN is translated into the real pge number (RPN). The 11 lower order bits of the page index portion of the virtual address are supplied from the adder directly to storage control logic element 6.

The present invention involves the parallel operations of both adding and translating in the same system cycle. This is accomplished by supplying the output from AI latch 2 to both ALU 3 and, by means of a lead 5, directly to address translation and storage control 6. Thus, the address computation proceeds in ALU 3 during a given cycle while the contents of AI latch 2 are also being translated in translation circuitry 6. This overlapping of address computation and translation results in increased system speed in the majority of situations. In those situations where the address computation does affect the high-order bits, such as in the case of a carry from the low-order bits, the translation reflecting the carry can be performed on the next cycle before the storage access commences. In this situation, the system would function in a manner similar to that of the prior art, with sequential add and translation operations in successive cycles. However, in the majority of situations, the technique of the present invention will result in increased operating efficiency by carrying out computation and translation operations in parallel during the same cycle.

I claim:

1. A method of operating a data processing system having a real memory and using virtual memory in which virtual memory addresses are formed by a base register value and a displacement value and are mapped to real memory addresses,
    said method comprising the steps of
        adding said base register value and said displacement value to form a virtual address having a plurality of bits therein,
        supplying a first specified number of the high order bits of said virtual address representing the virtual page number of said virtual address to address translation means to generate a translated real page address in said real memory; and
        simultaneously with translating said first specified number of high order bits in said address translation means, supplying a second specified number of the low order bits of said virtual address representing the page index portion of said virtual address to address computation means to generate the real page index in said real memory simultaneously with generation of said real page address.

2. A method in accordance with claim 1 in which said virtual memory address is a digital address having a plurality of bits therein, said base register value corresponding to the high order bits in said virtual memory address.

3. A method in accordance with claim 2 in which said virtual memory address includes a virtual page number portion and a virtual page index portion.

4. A method in accordance with claim 3 in which said virtual page number portion is represented by said high order bits.

5. A method in accordance with claim 3 in which said page index portion of said virtual memory address is represented by the low order bits in said virtual memory address.

6. A method in accordance with claim 3 in which said real memory address has a real page number portion and a real page index portion.

7. A method in accordance with claim 6 in which said real page number portion corresponds to said virtual page number portion of said virtual memory address.

8. A method in accordance with claim 6 in which said real page index portion of said real memory address corresponds to said virtual page index portion of said virtual memory address.

* * * * *

UNITED STATES PATENT AND TRADEMARK OFFICE
CERTIFICATE OF CORRECTION

PATENT NO. : 4,811,206
DATED : March 7, 1989
INVENTOR(S) : William M. Johnson

It is certified that error appears in the above-identified patent and that said Letters Patent is hereby corrected as shown below:

Col. 2, line 3, "table" should read --tables--.

Col. 3, line 53, "pge" should read --page--.

Signed and Sealed this

Second Day of January, 1990

Attest:

JEFFREY M. SAMUELS

Attesting Officer

Acting Commissioner of Patents and Trademarks